United States Patent Office 2,918,350
Patented Dec. 22, 1959

2,918,350

URANIUM DECONTAMINATION

John S. Buckingham and Jimmy L. Carroll, Richland, Wash., assignors to the United States of America as represented by the United States Atomic Energy Commission No Drawing. Application January 30, 1957
Serial No. 637,337

14 Claims. (Cl. 23—14.5)

This invention deals with a process of improving the decontamination of uranium and plutonium contained in aqueous solutions and in particular with the decontamination of uranium and/or plutonium from certain fission products such as ruthenium, zirconium and niobium.

The method of this invention is primarily intended for the processing of so-called dissolver solutions, which are solutions obtained by dissolving neutron-bombarded uranium in nitric acid. In addition to uranium, these dissolver solutions contain plutonium, fission products and usually also aluminum nitrate derived from the bonding alloy used for applying an aluminum jacket around the uranium-containing core. One process of separating the various elements contained in such dissolver solutions and/or recovering the uranium and plutonium values therefrom is based on extraction with a substantially water-immiscible organic solvent; in these extraction processes some of the salts present in the solution are selectively extracted into the solvent while others remain in the aqueous solution. In the case of methyl isobutyl ketone (hexone), uranyl and plutonyl nitrates are extrated while the bulk of the fission products remains in an aqueous raffinate.

In these solvent extraction processes decontamination is not complete, there being particularly three fission elements which cause difficulties because they are coextracted to a high degree into hexone together with the uranium and/or the plutonium instead of staying behind in the aqueous solution together with the other fission products. These hexone-coextractable fission products are ruthenium, zirconium and niobium.

It is an object of this invention to provide a process of reducing the extraction into hexone of ruthenium, zirconium and/or niobium values contained in aqueous plutonium and/or uranium solutions without impairing the extraction of said plutonium and uranium values.

It is another object of this invention to provide a process for decontaminating uranium and/or plutonium values from zirconium, niobium and ruthenium values contained in aqueous solutions which is simple and does not require any elaborate equipment.

It is still another object of this invention to provide a process for the removal of radioactive ruthenium values from aqueous solutions whereby no volatilization of said ruthenium takes place and the ruthenium is recovered in the form of a precipitate of a small volume so that disposal of it as waste is facilitated.

It has been found that by adding a water-soluble thiosulfate, such as sodium, potassium or ammonium thiosulfate, to a dissolver solution, a precipitate is formed which carries the bulk of the ruthenium values, and the noncarried ruthenium fraction together with the zirconium and niobium values present are "conditioned" so that their extractability into hexone is considerably reduced. (This greatly reduced extractability into hexone is sometimes referred to hereinafter as "hexone-nonextractable" for practical purposes.) Broadly, the process of this invention comprises adjusting the acidity of the dissolver solution to make it acid-deficient [1], heating the solution to between 55 and 70° C., adding a water-soluble thiosulfate to the solution and mixing or agitating the solution whereby a precipitate is formed. As a rule about 90 percent of the ruthenium present in the solution is carried on the thiosulfate precipitate.

As has been mentioned above, the dissolver solution has to be acid-deficient for the thiosulfate treatment. The preferred degree of acid-deficiency ranges between $-0.1$ and $-0.3$ M; at an acidity higher than $-0.1$ M very fine sulfur precipitates which is hard to separate from the solution, which separates unsatisfactorily by centrifuging. However, at an acidity of above $-0.1$ M the three fission products still are converted to the less extractable forms by the thiosulfate so that the decontamination process as a whole is still operative.

While the concentration of the uranyl nitrate in the dissolver solution may vary widely, a concentration of approximately 2 M was preferred for the process of this invention.

The thiosulfate precipitation is advantageously carried out at an elevated temperature, and the solution, for this purpose, is best heated to said temperature prior to the addition of the thiosulfate. The temperature should be at least 55° C. in order to obtain good and reasonably fast coagulation or agglomeration of the thiosulfate precipitate. At about 80° C. the precipitate becomes unstable, and a great fraction of the carried ruthenium compound redissolves as the less extractable form. In order to avoid redissolution of the carried ruthenium, the maximum temperature is preferably 70° C.

Sodium thiosulfate is the preferred salt for forming the precipitate. It is preferably added in the form of an aqueous solution that has a concentration of between 1 and 2 M; however, it can also be added in crystalline form. The quantity of thiosulfate should be adjusted so as to obtain, in the dissolver solution, a concentration of between 0.01 and 0.1 M. For optimum ruthenium carrying, the concentration should be about 0.05; however, at this and higher concentrations the precipitate was found to adhere to the container surfaces and to be difficult to remove therefrom. The preferred thiosulfate concentration was therefore determined to be about 0.033 M at which this adherence to the walls does not occur. The composition of the precipitate is not known.

After the thiosulfate has been added, the mixture is allowed to digest while the temperature of between 55 and 70° C. is maintained. Digestion should be carried out for at least about one hour. It is advantageous to stir the mixture during digestion; this can be carried out by mechanical means, by sparging with air or by any other means known to those skilled in the art.

In the following Example I an experiment is described which illustrates the effect of the concentration of thiosulfate on the decontamination of ruthenium.

EXAMPLE I

A feed solution 2 M in uranyl nitrate and 0.2 M nitric acid-deficient was spiked with $Ru^{106}$ whereby a concen-

---

[1] Acid-deficient solutions are not alkaline solutions. They are solutions in which the excess acid and part of the acidity resulting from hydrolysis of the salts present have been neutralized, for instance, with alkali metal hydroxide. A 0.2-M-acid-deficient solution, for instance, is a solution to which alkali metal hydroxide has been added in a quantity sufficient to neutralize all of the excess acid and 0.2 M of the acid derived from hydrolysis of the salt. Acid-deficient solutions are still acid solutions; a 0.2-M-acid-deficient nitrate-containing solution, for instance, usually has a pH value of about 1.5 for a solution about 2 M in uranyl nitrate.

tration of $2.83 \times 10^8$ β-counts/min./gal. was obtained. Various quantities of a thiosulfate solution were added to aliquots of this solution; each mixture thus obtained was then digested for one hour at 70° C. and finally centrifuged. The ruthenium decontamination factors (Ru D.F.) (amount of ruthenium in the feed solution × amount of uranium in the supernatant divided by amount of uranium in the feed solution × amount of ruthenium in the supernatant) were determined. The results are tabulated in Table I.

Table I

Thiosulfate Concn., M:                                  Ru D.F.
   0.01 _____ 3.18
   0.015 _____ 7.66
   0.02 _____ 18.8
   0.05 _____ 88.5
   0.10 _____ 60.2

This table shows that a thiosulfate concentration of 0.05 M brought about maximum ruthenium precipitation.

It was found that the γ-activity present in the dissolver solutions decomposed the precipitate and thus had an adverse effect on the ruthenium decontamination. For this reason it was considered advisable to separate the precipitate from the solution immediately after precipitation. For this reason, after the digestion period, the solution is cooled to from 50 to 35° C. and then centrifuged for a period of time ranging from 30 seconds to 10 minutes, depending upon the centrifugal force used. Thereafter the supernatant is separated immediately from the precipitate.

When it is preferred to recover the ruthenium together with the zirconium and niobium values, instead of separately removing ruthenium from the solution on the thiosulfate precipitate, sodium dichromate is added whereby the carried ruthenium is redissolved. In this case, the sodium dichromate is added immediately after the digestion period; the temperature of the solution is preferably raised to from 80 to 100° C. prior to the addition of sodium dichromate. The preferred sodium dichromate concentration in the dissolver solution is 0.2 M. The solution containing the dichromate is then digested at a temperature of between 80 and 100° C. for at least one hour, and preferably between 85 and 95° C. for four hours. The redissolved ruthenium is then present in the hexone-nonextractable form.

Sodium dichromate may also be added to the aqueous solution, the supernatant, after the thiosulfate precipitate has been removed. In this instance the dichromate has a preventive effect on the precipitation of sulfur which otherwise would take place and impair subsequent solvent extraction.

The separated supernatant is then adjusted for extraction with hexone for the recovery of uranium and/or plutonium. These extraction methods are not part of the invention; they are known to those skilled in the art.

The precipitate, prior to ruthenium recovery or prior to sending it to waste, as the case may be, is preferably washed, for instance, by slurrying it with water to remove any adhering plutonium and uranium values. This wash water solution can then be added to the supernatant.

Zirconium, niobium and ruthenium compounds have various types of utility. Ruthenium compounds, for instance, are useful as catalysts in chemical processes. Ruthenium chloride is employed for medicinal purposes. Furthermore, elemental ruthenium has been widely used as an ingredient of alloys. Similarly, zirconium is an essential component of corrosion-resistant alloys for construction materials, for instance in the chemical industry, and niobium is a valuable component of special steels. Furthermore, separation of ruthenium, zirconium and niobium brings about decontamination of uranium and plutonium and thereby regeneration of these two metals for re-use as fuel material in nuclear reactors.

The conversion of the extracted and/or precipitated ruthenium compounds and of the extracted zirconium and niobium compounds to the compounds having the utility just described is not part of the invention, and the methods suitable therefor are known to those skilled in the art.

In the following an example is given which illustrates the effect of acidity and of time and temperature of digestion on the decontamination from ruthenium.

EXAMPLE II

A series of precipitation experiments was carried out using, for each experiment, a 2-ml. portion of a feed solution prepared by dissolving uranium metal, which had been alloyed with metallic $Ru^{106}$, in nitric acid. The solution was 2.0 M in uranyl nitrate and had $2.83 \times 10^8$ β-counts/min./gal. derived from the $Ru^{106}$. The acidity was adjusted in each case to predetermined concentrations, the solutions were heated to digestion temperature and then made 0.025 M in sodium thiosulfate. Little agitation was used during digestion. After digestion the precipitates were separated from the supernatant by centrifugation for 10 minutes.

The ruthenium β-activity was counted in the supernatant liquid, and the decontamination factors were calculated therefrom. The results were not corrected for the activity of natural uranium daughters. The conditions of these experiments and decontamination factors obtained are compiled in Table II.

Table II

| Free $HNO_3$, M | Ruthenium Arithmetical Decontamination Factors, Ru D.F. | | | | | |
|---|---|---|---|---|---|---|
| | 30 Minutes | | 60 Minutes | | 120 Minutes | |
| | 60° C. | 70° C. | 60° C. | 70° C. | 60° C. | 70° C. |
| −0.3 | 2.8 | 3.6 | 5.9 | 6.7 | 6.7 | 7.6 |
| −0.2 | 3.3 | 5.3 | 5.9 | 6.7 | 6.9 | 7.3 |
| −0.1 | 5.7 | 3.1 | 6.4 | 7.3 | 7.7 | 7.3 |
| 0.0 | 5.7 | 6.0 | 7.1 | 6.7 | 7.3 | 1.8 |
| +0.1 | 3.1 | 5.0 | 5.4 | 2.6 |  | 1.3 |
| +0.2 | 2.8 | 2.1 | 2.6 | 1.6 | 1.6 | 1.3 |

These results show that a temperature of 70° C. brought about slightly better results than did 60° C. if the solution was acid-deficient. Table II also demonstrates that decontamination from acid solutions was considerably less than from acid-deficient solutions, this particularly when a longer digestion period was used. Furthermore, it can be concluded from these experiments that digestion should be carried out for at least one hour in order to obtain optimum results.

EXAMPLE III

One volume of a dissolver solution was diluted with four volumes of a uranyl nitrate solution to reduce the activity per volume; 5 ml. were used for each run, and four runs were carried out. The uranium content and acidity were adjusted in the solution obtained to the values desired. The solutions were then heated to 70° C., and a 1-M sodium thiosulfate solution was added to the samples for runs Nos. 3 and 4 in a quantity to obtain a concentration of 0.033 M, while runs Nos. 1 and 2 were carried out as control runs without the addition of thiosulfate. All four samples were digested for one hour at 70° C.

To the samples of runs Nos. 2 and 4 there was then added a solution of sodium dichromate in a quantity each to yield a concentration of 0.2 M whereupon these two samples were digested for one hour at 80° C. All four of the mixtures were then centrifuged for 10 minutes, and the supernatants were decanted. The supernatants of runs Nos. 1 and 3 were then made 0.2 M in sodium dichromate and also digested for one hour at 80° C. No ruthenium volatilization was noticed during the procedure just described in any of the four runs.

The precipitates were dissolved in hydrogen peroxide, and the solutions thus obtained were analyzed for zirconium plus niobium content and for their ruthenium content.

The supernatants were then subjected to an extraction procedure with hexone in a batch operation. The supernatants contained uranium in a concentration of 2.04 M, they were 0.1 M acid-deficient, 0.2 M in sodium dichromate and had $2.38 \times 10^{12}$ $\beta$-counts/min./gal. and $2.07 \times 10^7$ $\gamma$-microcuries/gal., 12 percent of the $\gamma$-counts being due to ruthenium and 79 percent to zirconium plus niobium. The hexone used for the extraction was neutral. After extraction, the hexone phases were scrubbed twice with aqueous solutions 2 M in aluminum nitrate, 0.05 M in sodium dichromate and 0.2 M deficient in nitric acid. The scrubbed hexone phases were then contacted, for back-extraction of plutonium, with an aqueous solution 1.3 M in aluminum nitrate, 0.05 M in ferrous sulfamate and 0.05 M in nitric acid. The plutonium strip solutions thus obtained were analyzed for zirconium plus niobium and for ruthenium.

The uranium was then back-extracted from the hexone phase with distilled water, and the uranium strip solutions obtained thereby were also analyzed for ruthenium and for zirconium plus niobium.

The volume ratio used in the extractions for supernatant:scrub:hexone:plutonium stripping solution:water was 1:1:4:1:2.

The results of the four runs, as logarithms of the decontamination factors, are compiled in Table III.

4 with run No. 3); this shows that the three elements were brought into an almost hexone-nonextractable form by the thiosulfate treatment.

It will be understood that this invention is not to be limited to the details given herein but that it may be modified within the scope of the appended claims.

What is claimed is:

1. A process of reducing the extraction of ruthenium zirconium and niobium values contained in an aqueous nitric acid uranium solution derived from neutron-irradiated uranium into hexone, comprising making said solution an acidic acid-deficient solution, heating the solution to between 55 and 70° C., adding a water-soluble inorganic thiosulfate to said solution whereby a precipitate is formed that carries the bulk of said ruthenium values and the remainder of said ruthenium values and the zirconium and niobium values are converted to a hexone-nonextractable form, and eliminating said precipitate.

2. The process of claim 1 wherein the precipitate is eliminated by physical separation.

3. The process of claim 1 wherein the precipitate is eliminated by adding sodium dichromate to the solution.

4. The process of claim 1 wherein said solution is made from −0.1 to −0.3 M acid-deficient.

5. The process of claim 1 wherein the thiosulfate is sodium thiosulfate.

6. The process of claim 5 wherein sodium thiosulfate is added in a quantity to yield a concentration of between 0.01 and 0.1 M.

7. The process of claim 6 wherein the concentration is 0.033 M.

8. The process of claim 1 wherein the solution, after addition of the thiosulfate, is digested for at least one hour at a temperature of between 55 and 70° C., cooled after digestion to from 50 to 35° C. and the precipitate is then immediately separated from a supernatant.

*Table III*

| Run No. | $S_2O_3^{=}$, M | $Na_2Cr_2O_7$ Added as to Precipitate Separation | Logarithmic Decontamination Factor, $dF$ [1] | | | | | |
|---|---|---|---|---|---|---|---|---|
| | | | Precipitation | | Uranium Extraction | | Plutonium Extraction | |
| | | | Ru | Zr+Nb | Ru | Zr+Nb | Ru | Zr+Nb |
| 1 | 0.00 | After | 0.00 | 0.00 | 2.17 | 4.27 | 2.25 | 3.26 |
| 2 | 0.00 | Before | 0.00 | 0.00 | 2.24 | 4.18 | 2.30 | 2.93 |
| 3 | 0.033 | After | 0.83 | 0.00 | 3.26 | 4.48 | 3.25 | 3.62 |
| 4 | 0.033 | Before | 0.04 | 0.02 | 3.68 | 4.66 | 3.09 | 3.60 |

[1] $dF$ for precipitation
$$= \log \frac{\text{amount of Ru (or Zr+Nb) in dissolver solution} \times \text{amount of U (Pu) in supernatant}}{\text{amount of U (Pu) in dissolver solution} \times \text{amount of Ru (or Zr+Nb) in supernatant}}$$

$dF$ for U extraction
$$= \log \frac{\text{amount of Ru (or Zr+Nb) in supernatant} \times \text{amount of U in U strip solution}}{\text{amount of U in supernatant} \times \text{amount of Ru (or Zr+Nb) in U strip solution}}$$

$dF$ for Pu extraction
$$= \log \frac{\text{amount of Ru (or Zr+Nb) in supernatant} \times \text{amount of Pu in Pu strip solution}}{\text{amount of Pu in supernatant} \times \text{amount of Pu in Pu strip solution}}$$

This table shows that the thiosulfate precipitates quite a substantial amount of ruthenium (compare run No. 3 with run No. 1) and that practically all ruthenium was redissolved by the sodium dichromate (run No. 4 vs. run No. 3). The table also shows that decontamination from ruthenium, zirconium and niobium was considerably improved in the hexone extractions when thiosulfate had been added; this is true in both, uranium and plutonium extractions. Furthermore, it is obvious from the above data that, although practically all ruthenium was redissolved when the sodium dichromate was added prior to the separation of the precipitate, decontamination of uranium by extraction was improved (compare run No.

9. The process of claim 8 wherein the solution is stirred during digestion.

10. The process of claim 9 wherein stirring is effected by sparging with air.

11. The process of claim 1 wherein the solution, after the addition of thiosulfate, is subjected to digestion for at least one hour at between 55 and 70° C., then heated to between 80 and 100° C., admixed with a sodium dichromate solution, and again digested for at least one hour at a temperature of between 80 and 100° C.

12. The process of claim 11 wherein the quantity of sodium dichromate is adjusted so that it is present in the solution in a concentration of about 0.2 M and the second digestion is carried out between 85 and 95° C. for four hours.

13. The process of claim 1 wherein the precipitate formed by the addition of thiosulfate is separated from a supernatant and sodium dichromate is then added to the supernatant as a preparation for extraction with hexone.

14. The process of claim 13 wherein the quantity of sodium dichromate is adjusted so that it is present in the solution in a concentration of about 0.2 M.

References Cited in the file of this patent

UNITED STATES PATENTS

| 2,766,204 | Lowe | Oct. 9, 1956 |
| 2,796,424 | Schulz et al. | June 18, 1957 |

OTHER REFERENCES

Culler: "Proceedings of the International Conference on the Peaceful Uses of Atomic Energy," vol. 9, pages 464–483, held in Geneva, August 8–20, 1955.